US012241744B2

(12) United States Patent
Goldman et al.

(10) Patent No.: US 12,241,744 B2
(45) Date of Patent: Mar. 4, 2025

(54) GEOLOCATION SYSTEM AND METHOD (71) Applicant: ELBIT SYSTEMS C4I AND CYBER LTD., Netanya (IL)

(72) Inventors: Benyamin Goldman, Netanya (IL); Ido Ariav, Netanya (IL); Asaf Avinoam, Netanya (IL); David Zaphir, Netanya (IL); Ohad Volvovitch, Netanya (IL); Yaron Mayerowicz, Netanya (IL)

(73) Assignee: ELBIT SYSTEMS C4I AND CYBER LTD., Netanya (IL)

( * ) Notice: Subject to any disclaimer, the term of this patent is extended or adjusted under 35 U.S.C. 154(b) by 0 days.

(21) Appl. No.: 18/789,922

(22) Filed: Jul. 31, 2024

(65) Prior Publication Data
US 2024/0384992 A1    Nov. 21, 2024

Related U.S. Application Data (63) Continuation of application No. PCT/IL2023/050108, filed on Jan. 31, 2023.

(30) Foreign Application Priority Data

Feb. 2, 2022 (IL) .......................................... 290466

(51) Int. Cl.
*G01C 21/00* (2006.01)
*G06T 7/33* (2017.01)
*G06T 7/73* (2017.01)

(52) U.S. Cl.
CPC ............ *G01C 21/005* (2013.01); *G06T 7/337* (2017.01); *G06T 7/74* (2017.01); *G06T 2207/10028* (2013.01); *G06T 2207/30252* (2013.01)

(58) Field of Classification Search
CPC ......... G01C 21/005; G06T 7/74; G06T 7/337; G06T 2207/10028; G06T 2207/30252; G06V 10/26; G06V 20/58; G05D 2101/15
(Continued)

(56) References Cited

U.S. PATENT DOCUMENTS

| 10,515,458 B1 | 12/2019 | Yakimenko et al. |
| 10,706,617 B2 | 7/2020 | Owechko |

(Continued)

FOREIGN PATENT DOCUMENTS

| WO | WO-2021011617 A1 * | 1/2021 | ......... G01C 21/3492 |
| WO | WO-2021138616 A1 * | 7/2021 | ............ B60W 10/04 |
| WO | WO-2021/198772 | 10/2021 | |

OTHER PUBLICATIONS

Alvin et al., "Localized Object Information from Detected Objects Based on Deep Learning in Video Scene," 2018, Publisher: IEEE.*
(Continued)

*Primary Examiner* — Tuan C To
(74) *Attorney, Agent, or Firm* — PEARL COHEN ZEDEK LATZER BARATZ LLP (57) ABSTRACT

A system for determining a geolocation of a mobile object movable through a terrain in a Global Navigation Satellite System (GNSS) signal attenuated environment is provided herein. The system may include: a sensor mountable on the mobile object and configured to obtain a dataset of a scene including three or more scene points; a digital storage unit configured to store a semantically segmented reference dataset representing the scene, the semantically segmented reference dataset having a reference coordinate system; and a processing unit configured to: determine three or more distances between the sensor and the three or more scene points; generate, based on the determined distance, an object semantically segmented projection dataset comprising a
(Continued)

projection of the detected three or more scene points in the reference coordinate system; register the semantically segmented projection dataset with respect to the semantically segmented reference dataset; and identify the respective scene points real-world geographical locations.

10 Claims, 3 Drawing Sheets

(58) Field of Classification Search
USPC .......................................................... 701/420
See application file for complete search history.

(56) References Cited

U.S. PATENT DOCUMENTS

| | | |
|---|---|---|
| 2017/0069214 A1 | 3/2017 | Dupray et al. |
| 2018/0061055 A1 | 3/2018 | Owechko |
| 2018/0232947 A1* | 8/2018 | Nehmadi ................ G01S 7/295 |
| 2018/0307303 A1* | 10/2018 | Powderly .............. G06T 19/006 |
| 2018/0321686 A1* | 11/2018 | Kanzawa .............. G05D 1/0246 |
| 2018/0357773 A1* | 12/2018 | Wang ...................... G06T 7/246 |
| 2019/0242711 A1 | 8/2019 | Ingersoll et al. |
| 2019/0258737 A1 | 8/2019 | Wang et al. |
| 2020/0018606 A1* | 1/2020 | Wolcott ............. G01C 21/3819 |
| 2020/0124422 A1* | 4/2020 | Lin Sörstedt et al. . G06V 20/56 |
| 2020/0150652 A1* | 5/2020 | Urano .................. G05D 1/0061 |
| 2020/0249028 A1* | 8/2020 | Fridin ................ G01C 21/3841 |
| 2020/0249041 A1* | 8/2020 | Begleiter ........... G01C 21/3492 |
| 2020/0386894 A1* | 12/2020 | Kanzawa .............. G01S 17/931 |
| 2021/0302993 A1 | 9/2021 | Zang et al. |
| 2022/0163346 A1* | 5/2022 | Han ..................... G06V 20/588 |

OTHER PUBLICATIONS

Asmaa et al., Improved Semantic Segmentation of Low-Resolution 3D Point Clouds Using Supervised Domain Adaptation, 2020, Publisher: IEEE.*

* cited by examiner

GEOLOCATION SYSTEM AND METHOD

CROSS REFERENCE TO RELATED APPLICATIONS

This application is a Continuation of International Application No. PCT/IL2023/050108, filed Jan. 31, 2023, which claims priority from Israel Patent Application No. 290466, filed Feb. 2, 2022, both of which are incorporated herewith by reference in their entirety.

FIELD OF THE INVENTION

The present invention relates to the field of geolocation systems and method, and more particularly, to global navigation satellite (GNS) less geolocation systems and method.

BACKGROUND OF THE INVENTION

Geolocation data is essential in many fields and applications. For example, geolocation systems may be required for navigation systems. Commonly used geolocation systems are based on global navigation satellite systems (GNSS). However, the use of GNSS based systems is not always possible or desirable. For example, GNSS signals may be easily jammed. In another example, the use of GNSS based systems may reveal a location of a platform utilizing the GNSS based system. In a further example, GNSS signals may not be available due to nature of the environment (e.g., indoor, or underground navigation). Some other geolocation systems are based on predefined three-dimensional (3D) data such as terrain model and aerial model or land cover data. However, utilization of such systems may require significant processing resources, a lot of pre-processing preparation and sometimes inaccessible. Also often changes in environment may require often production of updated model data. Such limitations may severely limit the usage of these systems on low resources platforms or units.

SUMMARY OF THE INVENTION

Some embodiments of the present invention provide a system for determining a geolocation of a mobile object movable through a terrain in a Global Navigation Satellite System (GNSS) signal attenuated environment. The system may include: a sensor mountable on the mobile object and configured to obtain a dataset of a scene including three or more scene points; a digital storage unit configured to store a semantically segmented reference dataset representing the scene, the semantically segmented reference dataset having a reference coordinate system; and a processing unit configured to: determine three or more distances between the sensor and the three or more scene points; generate, based on the determined distance, an object semantically segmented projection dataset comprising a projection of the detected three or more scene points in the reference coordinate system; register the semantically segmented projection dataset with respect to the semantically segmented reference dataset; based on the registration, identify the three or more scene points of the obtained dataset of the scene in the reference dataset to yield scene points real-world geographical locations thereof; and determine, based on the three or more distances and the scene points real-world geographical locations, a current real-world geographical location of the mobile object.

In some embodiments, the three or more scene points belong to one or more objects in the scene.

In some embodiments, the semantically segmented reference dataset includes a semantically segmented two-dimensional (2D) reference vectorial map of the scene, and wherein the semantically segmented projection dataset includes a semantically segmented 2D projection of the three or more scene points in the reference coordinate system.

In some embodiments, the processing unit is configured to determine the current real-world geographical location of the mobile object further based on at least one known real-world geographical location of the mobile object along a travel route of the mobile object in the terrain.

In some embodiments, the processing unit is further configured to determine, based on the registration, current real-world geographical orientation of the mobile object.

In some embodiments, the processing unit is configured to determine the distance based on the obtained dataset using one or more pre-trained artificial intelligence algorithms.

In some embodiments, the sensor is an optical sensor.

In some embodiments, the obtained dataset of the scene is a perspective image of the scene.

In some embodiments, the sensor is a LIDAR sensor.

In some embodiments, the system includes: an additional sensor configured to be installed on the mobile object and configured to obtain additional sensor data representing the scene, wherein the processing unit is further configured to determine the distance based on the additional sensor data.

In some embodiments, the system includes: a navigation unit configured to be installed on the mobile object and configured to track real-world geographical location of the mobile object, wherein the processing unit is further configured to update the tracked real-world geographical location based on the determined current real-world geographical location of the mobile object.

Some embodiments of the present invention provide a system for determining a geolocation of a mobile object movable through a terrain in a Global Navigation Satellite System (GNSS) signal attenuated environment, the system may include: a user interface mountable on the mobile object and configured to obtain three or more scene points through manual targeting; a digital storage unit configured to store a semantically segmented reference dataset representing the scene, the semantically segmented reference dataset having a reference coordinate system; and a processing unit configured to: determine a distance between the mobile object and the three or more scene points; generate, based on the determined distance, a semantically segmented projection dataset includes a projection of the detected three or more scene points in the reference coordinate system; register the semantically segmented projection dataset with respect to the semantically segmented reference dataset; based on the registration, identify the three or more scene points of the obtained dataset of the scene in the reference dataset to yield scene points real-world geographical locations thereof; and determine, based on the three or more distances and the scene points real-world geographical locations, a current real-world geographical location of the mobile object.

Some embodiments of the present invention provide a system for determining a geolocation of a mobile object movable through a terrain in a Global Navigation Satellite System (GNSS) signal attenuated environment, the system may include: a sensor mountable on the mobile object and configured to obtain a two-dimensional (2D) perspective image of a scene, the scene including three or more scene points; a digital storage unit configured to store a semantically segmented 2D reference vectorial map of the scene having a reference coordinate system, the semantically segmented 2D reference vectorial map and the obtained 2D perspective image representing the scene in different substantially perpendicular planes; and a processing unit configured to: determine three or more distances between the sensor and the three or more scene points; generate, based on the determined three or more distances, a semantically segmented projection dataset includes a semantically segmented 2D projection of the detected three or more scene points in the reference coordinate system; register the semantically segmented projection dataset with respect to the semantically segmented 2D reference vectorial map; based on the registration, identify the three or more scene points of the obtained 2D perspective image of the scene in the semantically segmented 2D reference vectorial map to yield scene points real-world geographical locations thereof; and determine, based on the three or more distances and the scene points real-world geographical locations, a current real-world geographical location of the mobile object.

In some embodiments, the three or more scene points belong to one or more objects in the scene.

In some embodiments, the processing unit is configured to determine the current real-world geographical location of the mobile object further based on at least one known real-world geographical location of the mobile object along a travel route of the mobile object in the terrain.

In some embodiments, the processing unit is further configured to determine, based on the registration, current real-world geographical orientation of the mobile object.

In some embodiments, the processing unit is configured to determine the three or more distances based on the obtained 2D perspective image using one or more pre-trained artificial intelligence algorithms.

In some embodiments, the sensor is an optical sensor.

In some embodiments, the sensor is a LIDAR sensor.

In some embodiments, the system includes: an additional sensor configured to be installed on the mobile object and configured to obtain additional sensor data representing the scene, wherein the processing unit is further configured to determine the three or more distances based on the additional sensor data.

In some embodiments, the system includes: a navigation unit configured to be installed on the mobile object and configured to track real-world geographical location of the mobile object, wherein the processing unit is further configured to update the tracked real-world geographical location based on the determined current real-world geographical location of the mobile object.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the figures. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Currently common techniques for navigating a mobile object such as manned or unmanned vehicles (UV) or aerial vehicles, make intensive use of GNSS systems, such as the US-operated Global Positioning system (GPS) or the European-operated "Galileo" system. Some techniques avoid GNSS systems but use intensive 3D models.

Embodiments of the present invention address navigating mobile objects in situations where GNSS signal is not available or not desirable, due to limitations, for instance operational or technological, or mobile object has resources limitations (e.g., weight, computing unit, power etc.)

For example, in various scenarios GNSS based signal may be unavailable due to lack of satellite line of sight. In another examples, us of GNSS based navigation may be undesirable, for example, to prevent mobile object detection or geolocation.

In other examples, mobile object lack of resources to store and compute 3D model based navigation systems.

Figure 1:
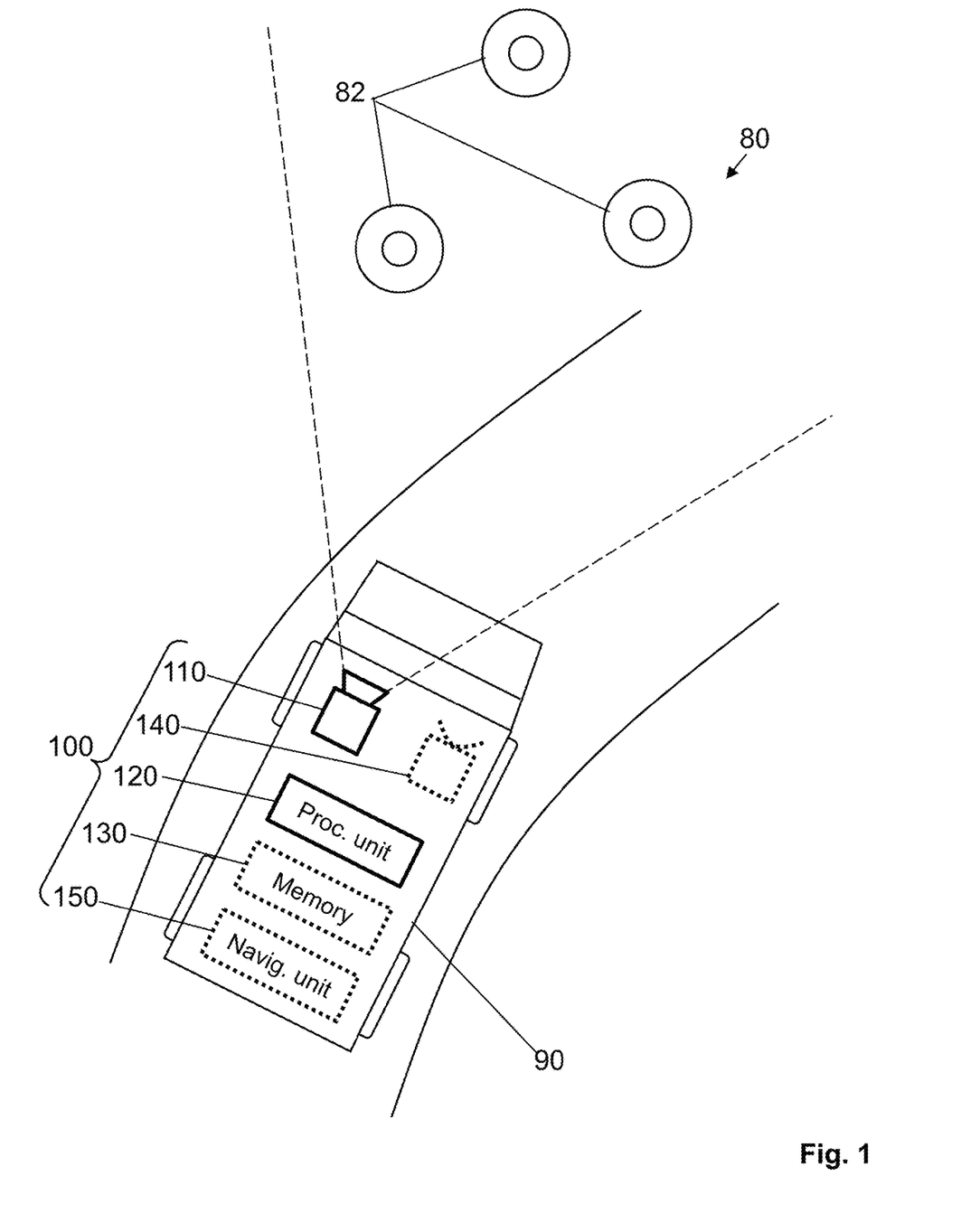
FIG. 1 shows a schematic illustration of a geolocation system installed on a mobile platform movable through a terrain, according to some embodiments of the invention.

Reference is now made to FIG. 1, which is a schematic illustration of a geolocation system 100 installed on a mobile object 90 movable through a terrain, according to some embodiments of the invention.

According to some embodiments of the invention, system 100 may include an optical sensor 110 and a processing unit 120.

Optical sensor 110 may be installed on a mobile object 90. Optical sensor 110 may, for example, include a still camera, a video camera.

Embodiment of the present invention are not limited to the seen range of electromagnetic radiation and may also operate in other ranges such as near IR and medium range IR 3-5 micron where embodiments of the present invention are able to detect and separate objects from. In some embodiments, system 100 may include one or more optical sensors 110. Optical sensor 110 may obtain a perspective image (e.g., two-dimensional (2D) perspective image) of a scene 80 of a terrain. Optical sensor 110 may transmit the perspective image of scene 80 to processing unit 120.

Mobile object 90 may, for example, be a mobile platform (e.g., a land vehicle, an aerial vehicle, a maritime vehicle manned or unmanned etc.) or a human. For example, FIG. 1 schematically depicts mobile object 90 as a land vehicle.

Scene 80 of the terrain may include one or more scene objects 82. Scene objects 82 may include any recognizable objects in the terrain. For example, scene objects 82 may include trees, roads, crossroads, road bifurcations, stones on roadsides, land cover and the like.

In some embodiments, processing unit 120 may detect one or more scene objects 82 in the perspective image of scene 80. Processing unit 120 may determine estimated current geolocation of mobile object 90 relative to the "object starting point", being a point having known real-world geographical coordinates.

It is noted that an initial location point must be known on a global coordinate system otherwise the geolocation information retrieved may be only in local coordinates system, based on the perspective image of scene 80, range of three or more objects in the perspective image of scene 80 or three points on a single object relative to the mobile object 90.

According to some embodiments, it is required that three separated objects e.g., not collinear from mobile object perspective or an object such as path or road where more than a single point can be extracted, are detected as scene objects 82 and a reference dataset. The depth data of the perspective image of scene 80 may, for example, include a distance between optical sensor 110 and each of scene objects 82, to yield at least three distances.

The reference dataset may represent scene 80. The reference dataset may be indicative of geolocation of objects (e.g., like scene objects 82) in the terrain. In some embodiments, the reference dataset may include a semantically segmented dataset indicative of geolocations of objects in the terrain. In some embodiments, the reference dataset may include a reference two-dimensional (2D) vectorial map indicative of geolocation of objects in the terrain. In some embodiments, the perspective image (e.g., the 2D perspective image) of scene 80 and the reference 2D vectorial map may represent scene 80 in different planes. For example, the perspective image of scene 80 and the reference 2D vectorial map may represent scene 80 in perpendicular (or substantially perpendicular) planes.

According to some embodiments of the present invention, resolution limits may be defined according to the accuracy of the geolocation result. In some embodiments, processing unit 120 may generate a semantically segmented perspective image of scene 80 based on the perspective image of scene 80 and the one or more scene objects 82 detected in the perspective image of scene 80.

Processing unit 120 may further determine current geolocation of mobile object 90 based on the semantically segmented perspective image of scene 80, the depth data of the perspective image of scene 80 and the reference dataset. In some embodiments, processing unit 120 may determine current real-world geographical position and orientation of mobile object 90 based on the semantically segmented perspective image of scene 80, the depth data of the perspective image of scene 80 and the reference dataset.

In some embodiments, processing unit 120 may generate a semantically segmented 2D projection image of scene 80. For example, processing unit 120 may generate the segmented 2D projection image of scene 80 based on the semantically segmented perspective image of scene 80 and the depth data of the perspective image of scene 80. In another example, processing unit 120 may generate a 2D projection image of scene 80 based on the perspective image of scene 80 and the depth data of the respective image of scene 80, detect one or more scene objects 82 in the 2D projection image of scene 80, and further generate the semantically segmented 2D projection image of scene 80 based on the 2D projection image of scene 80 and one or more detected scene objects 82. In some embodiments, processing unit 120 may register the semantically segmented 2D projection image of scene 80 with respect to the semantically segmented reference 2D vectorial map of the terrain. In some embodiments, processing unit 120 may determine the current geolocation of mobile object 90 based on the registration. In some embodiments, processing unit 120 may determine current real-world geographical position and orientation of mobile object 90 based on the registration.

In various embodiments, processing unit 120 may determine current geolocation and/or current real-world geographical position and orientation of mobile object 90 further based on at least one known real-world geographical location of mobile object 90 along a travel route of mobile object 90 in the terrain. For example, an initial real-world geographical location of mobile object 90 may be known or obtained using a GSS based system.

In various embodiments, processing unit 120 may semantically segment the perspective image of scene 80 and/or the 2D projection image of scene 80 using one or more artificial intelligence (AI) algorithms.

In some embodiments, processing unit 120 may determine the depth data of the perspective image of scene 80 using one or more AI algorithms. This may be achieved by extracting depth given RGB image again with Neural Nets such as Fully Convolutional Residual Networks.

In some embodiments, processing unit 120 may determine the depth data of the perspective image of scene 80 based on data obtained by one or more additional sensors 140. For example, system 100 may include one or more additional sensors 140 configured to be installed on mobile object 90 and configured to obtain data indicative of a two-dimensional (2D) and/or a three-dimensional (3D) representation of scene 80. One or more additional sensors 140 may, for example, include a radar, a LIDAR, an additional optical sensor supporting a stereo camera, and one or more additional sensors 140 having a simple laser range measure. One or more additional sensors 140 may transmit the obtained data to processing unit 120. Processing unit 120 may determine the range to the relevant detected objects of scene 80 based on the data received from one or more additional sensors 140.

In some embodiments, system 100 may include a navigation unit 150. Navigation unit 150 may be installed on mobile object 90. Navigation unit 150 may, for example, be an inertial navigation unit which may also include a compass or a GPS unit. Navigation unit 150 may track geolocation of mobile object 90. Navigation unit 150 may transmit the tracked geolocation of mobile object 90 to processing unit 120. Processing unit 120 may update the geolocation of mobile object 90 being tracked by navigation unit 150 based on the geolocation of mobile object 90 being determined using the perspective image of scene 80 and/or the 2D projection image of scene 80. For example, navigation unit 150 may have a known drift (e.g., an integration drift) that may cause an error in the tracked geolocation of mobile object 90. Processing unit 120 may reset, or reinitialize, navigation unit 150 by updating the geolocation of mobile object 90 being tracked by navigation unit 150 based on the geolocation of mobile object 90 being determined using the perspective image of scene 80 and/or the 2D projection image of scene 80. In some embodiments, processing unit 120 may periodically update the tracked geolocation of mobile object 90 based on the determined geolocation of mobile object 90. In some embodiments, a frequency of the update may be determined based on the know drift of navigation unit 150.

While optical sensor 110 is described with respect to FIG. 1, system 100 may use sensors other than optical sensor 110 to obtain a dataset indicative of representation of scene 80. For example, system 100 may include LIDAR or any other suitable sensor capable of obtaining a dataset indicative of representation of scene 80.

Figure 2A:
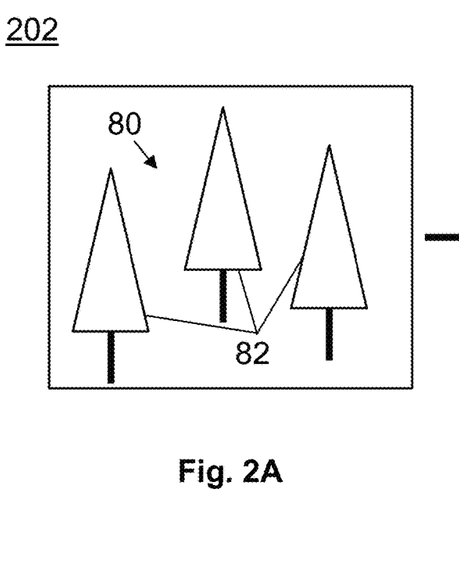
FIGS. 2A, 2B and 2C are schematic illustrations of a perspective image of a scene, a semantically segmented two-dimensional (2D) projection image of the scene, and a reference semantically segmented 2D vectorial map of a terrain, respectively, according to some embodiments of the invention.
Figure 2B:
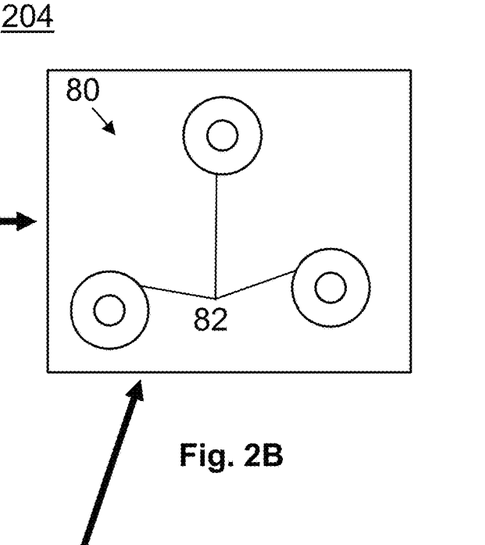
Figure 2C:
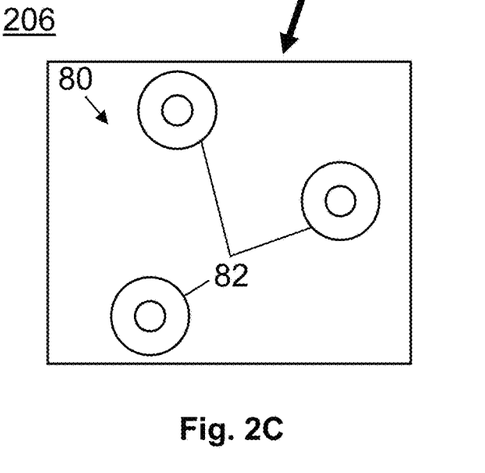

Reference is now made to FIGS. 2A, 2B and 2C, which are schematic illustrations of a perspective image 202 of a scene 80, a semantically segmented two-dimensional (2D) projection image 204 of scene 80, and a reference semantically segmented 2D vectorial map 206 of a terrain, respectively, according to some embodiments of the invention.

As described above with respect to FIG. 1, an optical sensor of a geolocation system (e.g., optical sensor 110 of system 100) installed on a mobile object may obtain a perspective image 202 of scene 80. Perspective image 202 of scene 80 may include one or more scene objects 82 (e.g., trees as schematically shown in FIGS. 2A, 2B and 2C). A processing unit of the geolocation system (e.g., processing unit 120) may generate a semantically segmented 2D projection image 204 of scene 80 (e.g., as described above with respect to FIG. 1). The processing unit may register semantically segmented 2D projection image 204 with a reference semantically segmented 2D vectorial map 206 of scene 80. Reference semantically segmented 2D vectorial map 206 may be indicative of geolocation of objects (e.g., such as scene objects 82) in the terrain (e.g., as described above with respect to FIG. 1). The processing unit may determine current geolocation of the mobile object based on the registration. As shown in FIGS. 2A and 2C, perspective image 202 of scene 80 and reference semantically segmented 2D vectorial map 206 represent scene 80 in different, e.g., perpendicular (or substantially perpendicular) planes.

Advantageously, the aforementioned features of some embodiments of the invention allow a significant reduction of storage which is usually required by navigation systems and may also enable cloud computing through low communication.

Figure 3:
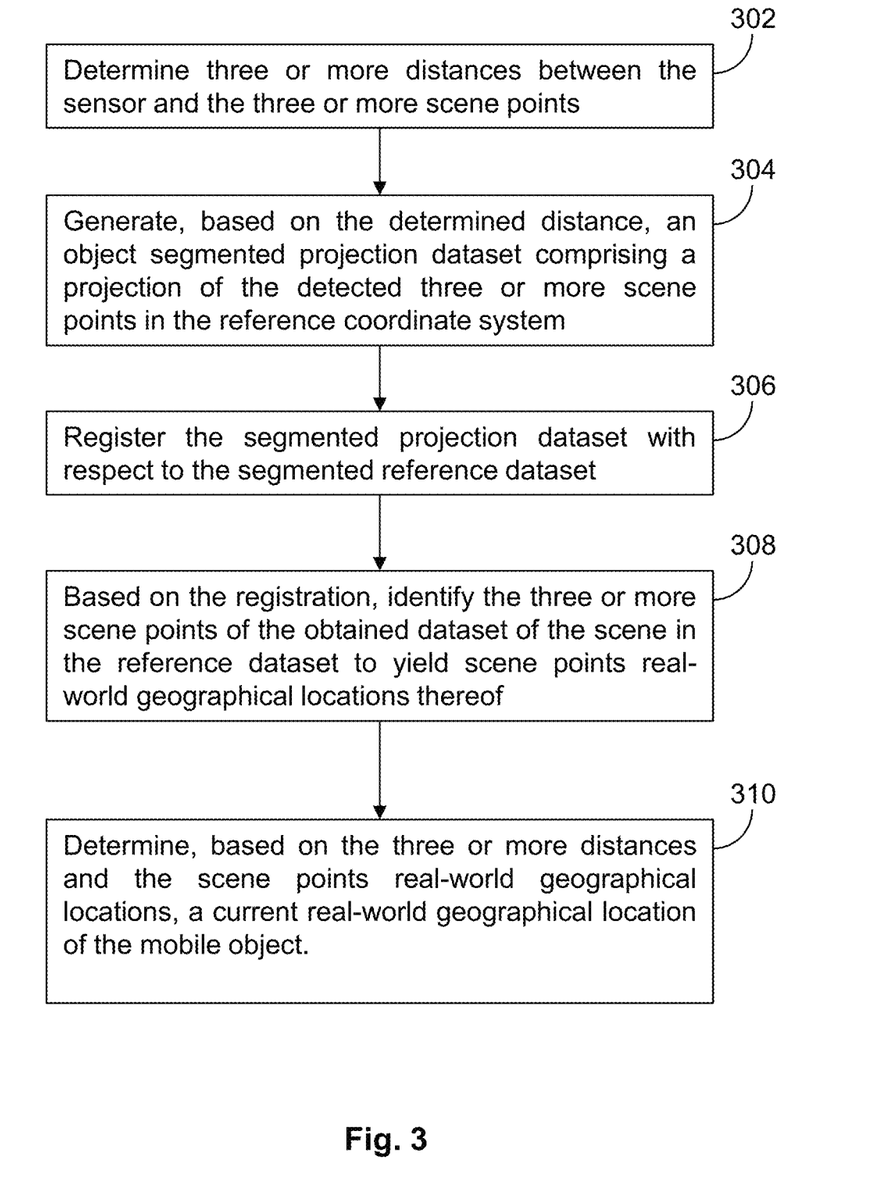
FIG. 3 is a high-level flowchart of a geolocation method, according to some embodiments of the invention.

Reference is now made to FIG. 3, which is a flowchart of a geolocation method, according to some embodiments of the invention.

The method may include obtaining, using a sensor mountable on the mobile object, a dataset of a scene including three or more scene points; storing a semantically segmented reference dataset representing the scene, the semantically segmented reference dataset having a reference coordinate system. The method then determines three or more distances between the sensor and the three or more scene points. generates, based on the determined distance, an object semantically segmented projection dataset comprising a projection of the detected three or more scene points in the reference coordinate system 302; register the semantically segmented projection dataset with respect to the semantically segmented reference dataset 304; based on the registration, identify the three or more scene points of the obtained dataset of the scene in the reference dataset to yield scene points real-world geographical locations thereof 306; and determine, based on the three or more distances and the scene points real-world geographical locations, a current real-world geographical location of the mobile object 308.

The depth data of the perspective image may, for example, include a distance between the optical sensor and three or more scene objects or three distances to spatially distinct objects such as crossroads which are regarded as multi point objects and have three or more spatially distinct points.

The reference dataset may be indicative of geolocation of objects (e.g., such as the scene objects) in the terrain. In some embodiments, the reference dataset may include a semantically segmented dataset indicative of geolocations of objects in the terrain. In some embodiments, the reference dataset may include a semantically segmented reference two-dimensional (2D) vectorial map of the terrain indicative of geolocation of objects in the terrain.

Some embodiments may include generating, by the processing unit, a semantically segmented perspective image of the scene based on the perspective image of the scene and the one or more detected scene objects (e.g., as described above with respect to FIG. 1). Some embodiments may include determining current geolocation of the mobile object based on the semantically segmented perspective image of the scene, the depth data of the perspective image of the scene and the reference dataset (e.g., as described above with respect to FIG. 1). Some embodiments may include determining, by the processing unit, current real-world geographical position and orientation of the mobile object based on the semantically segmented perspective image of the scene, the depth data of the perspective image of the scene and the reference dataset (e.g., as described above with respect to FIG. 1).

Some embodiments may include generating, by the processing unit, a semantically segmented 2D projection image of the scene. Some embodiments may include generating, by the processing unit, the semantically segmented 2D projection image of the scene based on the semantically segmented perspective image of the scene and the depth data of the perspective image of the scene (e.g., as described above with respect to FIG. 1). Some embodiments may include generating, by the processing unit, a 2D projection image of the scene based on the perspective image of the scene and the depth data of the respective image of the scene, detect the one or more scene objects in the 2D projection image of the scene, and further generate the semantically segmented 2D projection image of the scene based on the 2D projection image of the scene and the one or more detected scene objects (e.g., as described above with respect to FIG. 1). Some embodiments may include registering, by the processing unit, the semantically segmented 2D projection image of the scene with respect to the semantically segmented reference 2D vectorial map of the terrain. Some embodiments may include determining, by the processing unit, current geolocation of mobile object based on the registration (e.g., as described above with respect to FIG. 1). Some embodiments may include determining, by the processing unit, current real-world geographical position and orientation of the mobile object based on the registration (e.g., as described above with respect to FIG. 1).

Various embodiments may include determining, by the processing unit, current geolocation and/or current real-world geographical position and orientation of the mobile object further based on at least one known real-world geographical location of the mobile object along a travel route of the mobile object in the terrain (e.g., as described above with respect to FIG. 1). For example, an initial real-world geographical location of the mobile object may be known or obtained using a GNSS based system.

Various embodiments may include segmenting, by the processing unit, the perspective image of the scene and/or the 2D projection image of the scene using one or more artificial intelligence (AI) algorithms (e.g., as described above with respect to FIG. 1).

Some embodiments may include determining, by the processing unit, the depth data of the perspective image of the scene using one or more AI algorithms (e.g., as described above with respect to FIG. 1).

Some embodiments may include determining, by the processing unit, the depth data based on data obtained by one or more additional sensors configured to be installed on the mobile object, wherein the data obtained by the one or more additional sensors is indicative of a two-dimensional (2D) and/or a three-dimensional (3D) representation of the scene (e.g., one or more additional sensors 140 described above with respect to FIG. 1).

Some embodiments may include tracking, by a navigation unit, or machine vision techniques such as optical flow, geolocation of the mobile object (e.g., navigation unit 150 described above with respect to FIG. 1). Some embodiments may include updating, by the processing unit, the geolocation of the mobile object being tracked by the navigation unit based on the geolocation of the mobile object being determined using the perspective image of the scene and/or the 2D projection image of the scene (e.g., as described above with respect to FIG. 1). Some embodiments may include periodically updating, by the processing unit, the geolocation of the mobile object being tracked by the navigation unit based on the geolocation of the mobile object being determined using the perspective image of the scene and/or the 2D projection image of the scene (e.g., as described above with respect to FIG. 1). Some embodiments may include determining a frequency of the update based on a known drift of the navigation unit or machine vision techniques such as optical flow.

The disclosed system and method may provide a tool for determining geolocation and/or real-word geographical position and orientation of a mobile object (e.g., a vehicle of a human) based on images being obtained by an optical sensor installed on the mobile object and a reference dataset indicative of geolocation of objects in the terrain. Advantageously, in some embodiments, a reference 2D vectorial map of the terrain, optionally semantically segmented reference 2D vectorial map of the terrain, may be sufficient to determine the geolocation of the mobile object. Such reference 2D vectorial map may occupy relative low memory space and/or require relatively low computational resources and therefor low power (e.g., as compared to 3D models of the terrain typically being used in existing geolocation systems) to determine the geolocation of the mobile object based thereon. Such system relying on the reference 2D vectorial map of the terrain for determining the geolocation of the object may be entirely installed on the mobile object while eliminating a need (or at least drastically reducing a need) in wireless connectivity to remote computational resources. The disclosed system and method may enable navigation of the mobile object through the terrain without relying on GNSS based systems, which may be unavailable in the terrain due to jamming thereof. Furthermore, the disclosed system and method may improve an accuracy of inertial navigation units installed on the mobile object. For example, the geolocation of the object being tracked by the inertial navigation unit may be periodically updated based on the geolocation of the mobile object being determined using the images from the optical sensor.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone.

Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for determining a geolocation of a mobile object movable through a terrain in a Global Navigation Satellite System (GNSS) signal attenuated environment, the system comprising:

a sensor mountable on the mobile object and configured to obtain a dataset of a scene including three or more scene points;

a digital storage unit configured to store a semantically segmented reference dataset representing the scene, the semantically segmented reference dataset having a reference coordinate system; and a processing unit configured to:
  determine three or more distances between the sensor and the three or more scene points;
  generate, based on the determined distance, an object semantically segmented projection dataset comprising a projection of the detected three or more scene points in the reference coordinate system;
  register the semantically segmented projection dataset with respect to the semantically segmented reference dataset;
  based on the registration, identify the three or more scene points of the obtained dataset of the scene in the reference dataset to yield scene points real-world geographical locations thereof; and
  determine, based on the three or more distances and the scene points real-world geographical locations, a current real-world geographical location of the mobile object.

2. The system of claim 1, wherein the three or more scene points belong to one or more objects in the scene.

3. The system of claim 1, wherein the semantically segmented reference dataset comprises a semantically segmented two-dimensional (2D) reference vectorial map of the scene, and wherein the semantically segmented projection dataset comprises a semantically segmented 2D projection of the three or more scene points in the reference coordinate system.

4. The system of claim 1, wherein the processing unit is configured to determine the current real-world geographical location of the mobile object further based on at least one known real-world geographical location of the mobile object along a travel route of the mobile object in the terrain.

5. The system of claim 1, wherein the processing unit is further configured to determine, based on the registration, current real-world geographical orientation of the mobile object.

6. The system of claim 1, wherein the processing unit is configured to determine the distance based on the obtained dataset using one or more pre-trained artificial intelligence algorithms.

7. The system of claim 1, wherein the sensor is an optical sensor.

8. The system of claim 7, wherein the obtained dataset of the scene is a perspective image of the scene.

9. The system of claim 1, wherein the sensor is a LIDAR sensor.

10. The system of claim 1, further comprising: an additional sensor configured to be installed on the mobile object and configured to obtain additional sensor data representing the scene, wherein the processing unit is further configured to determine the distance based on the additional sensor data.

* * * * *